Oct. 6, 1936.  F. F. DAVIS  2,056,568
DISPENSING SYSTEM
Filed June 11, 1934  4 Sheets-Sheet 1
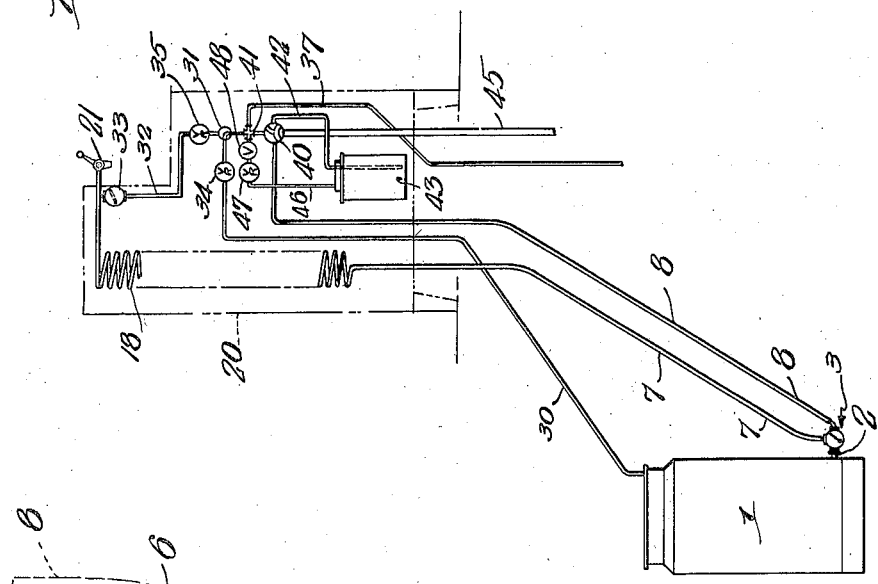
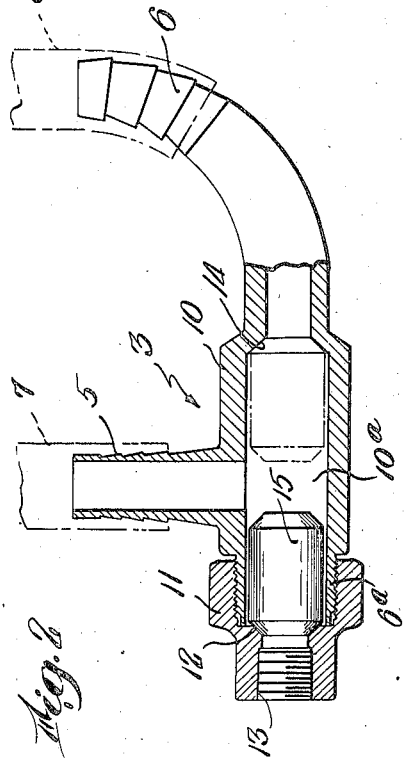
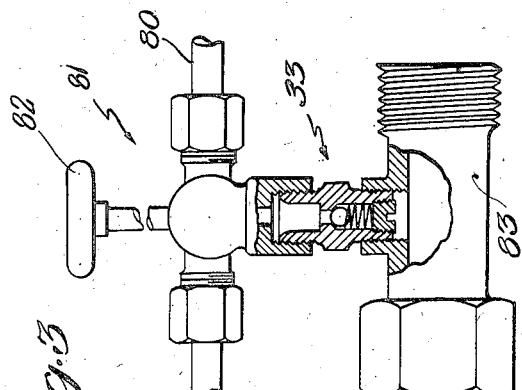

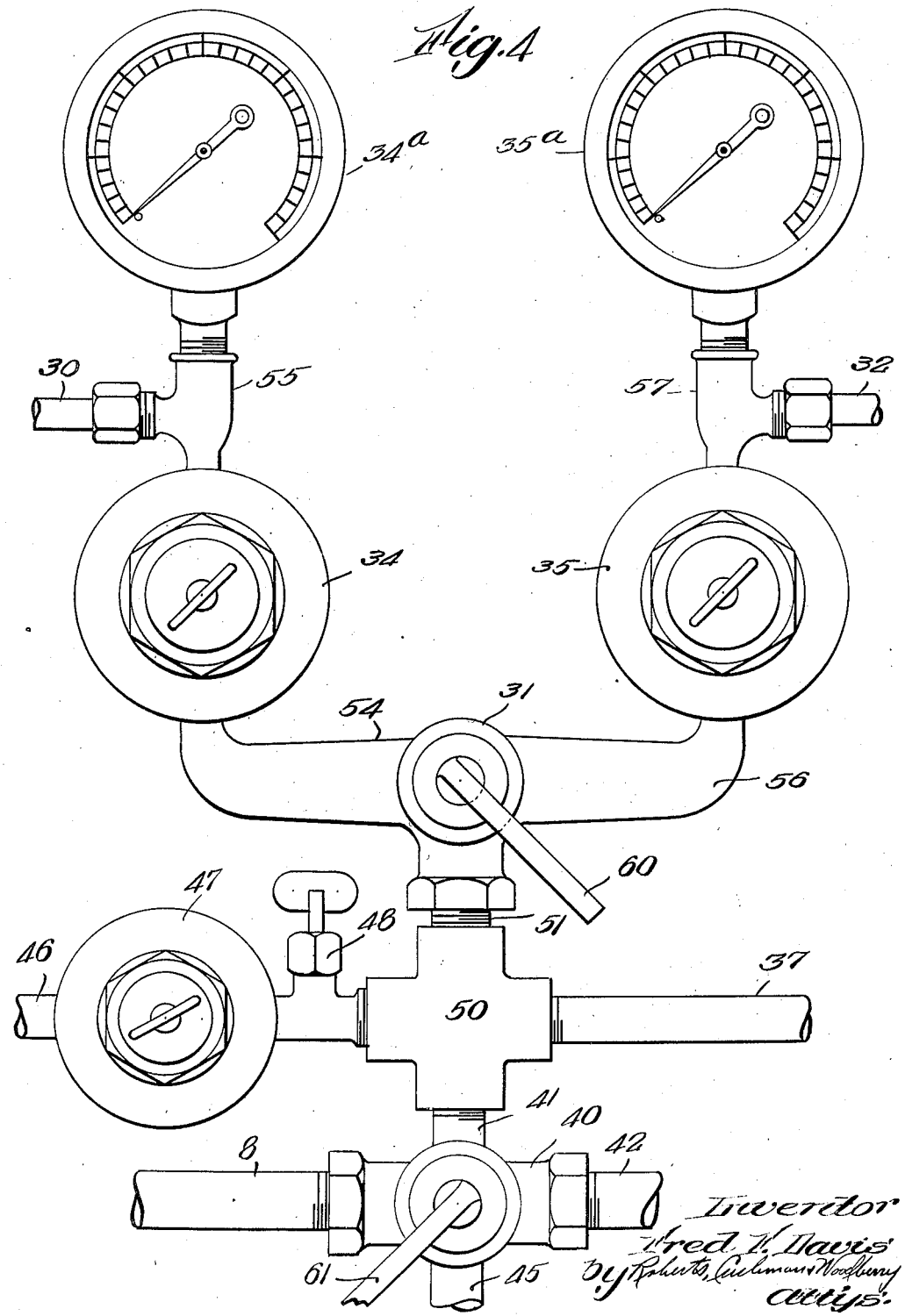

Oct. 6, 1936.  F. F. DAVIS  2,056,568
DISPENSING SYSTEM
Filed June 11, 1934  4 Sheets-Sheet 3
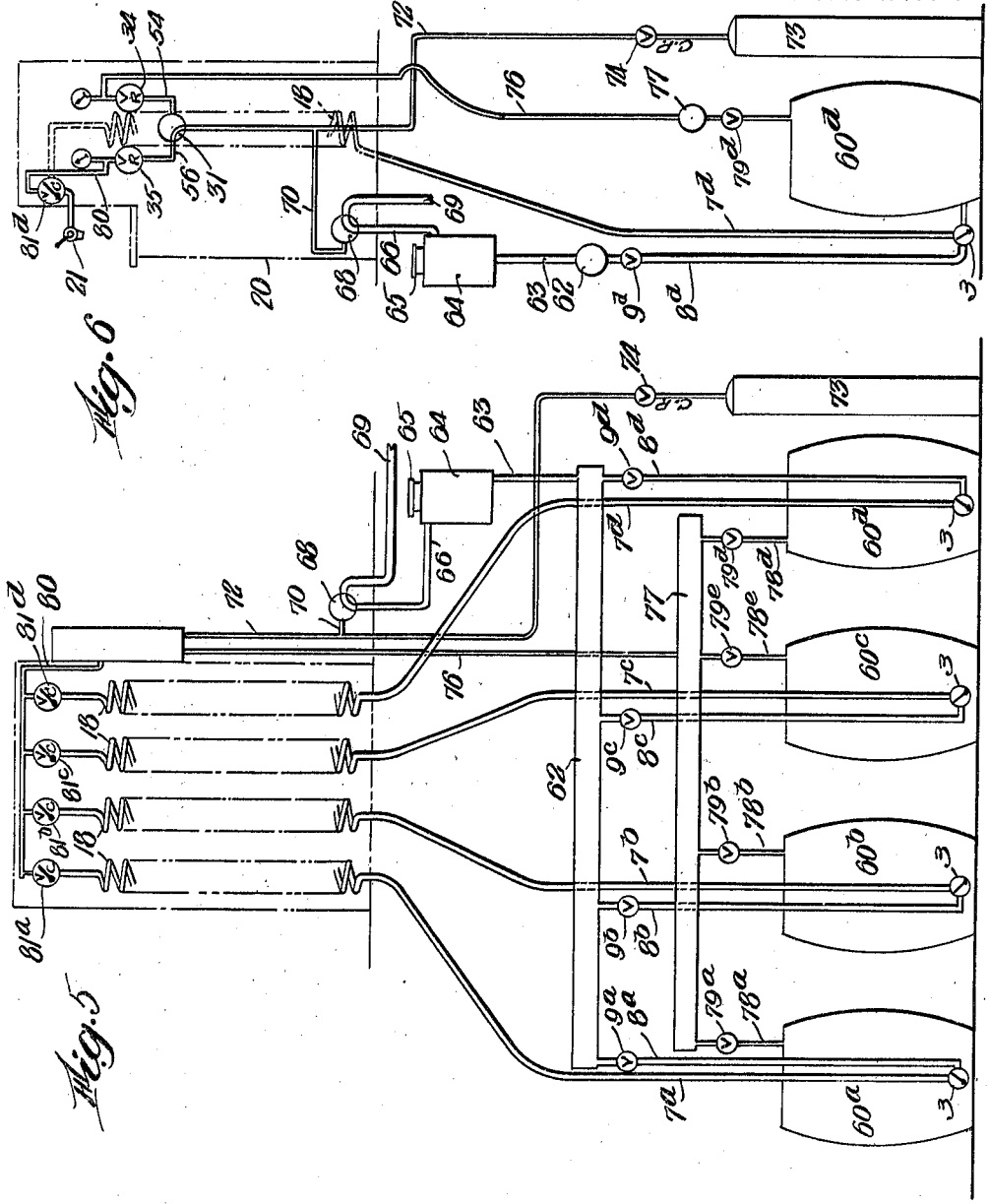

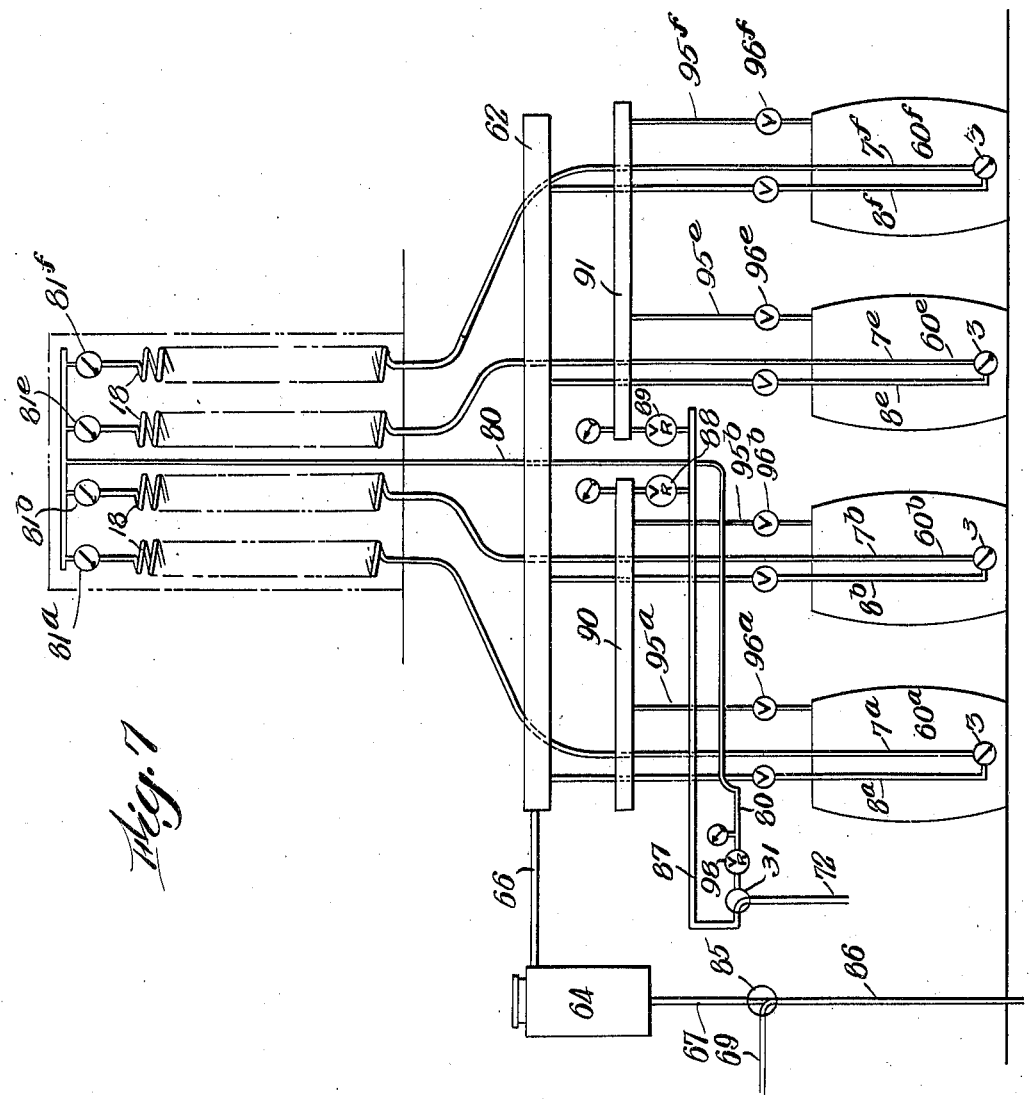

Patented Oct. 6, 1936

2,056,568

UNITED STATES PATENT OFFICE 2,056,568

DISPENSING SYSTEM

Fred F. Davis, Roxbury, Mass.

Application June 11, 1934, Serial No. 729,956

6 Claims. (Cl. 225—12)

This invention relates to a fluid dispensing system and more particularly to a system for dispensing beverages such as beer, ale, carbonated drinks, coffee, etc.

In such systems the liquid to be dispensed is usually drawn from a supply reservoir and forced through the distributing conduits, either by gravity or by pressure, to the dispensing points, and in distributing liquids of a relatively unstable or chemically reactive character, great care must be exercised to prevent deterioration of the liquid and fouling of the system. In dispensing such liquids as beer, carbonated drinks, coffee, milk, and the like beverages which are apt to deteriorate on standing or remaining in contact with metallic surfaces, it is necessary to drain and thoroughly flush the distributing lines periodically in order to insure dispensing a wholesome beverage and prevent the deposition of extraneous matter and the formation of slime, sludges, etc. which are apt to foul the distributing lines. For example, in systems for dispensing beer, ale and fermented beverages in general, it is absolutely necessary to clean out or flush the distributing lines at least once every twenty-four hours in order to prevent the formation or precipitation of yeast sludges or "beer stone" and also to drain such beverages from the distributing lines and cooling coils before closing the system down, so that during the periods when the system is not in use the beverage is not permitted to remain in contact with the metallic surfaces of the distributing pipes and cooling coils. As fermented beverages and carbonated drinks must always be kept under pressure so that they will not lose their charge and become "dead" or flat tasting, the beverage drained or expelled from the distributing pipes and cooling coils can not be salvaged and is usually thrown away. This loss of beverage, as well as the time consumed and difficulty involved in cleaning out the distributing system, represents, in the aggregate, a considerable sum of money and adds appreciably to the cost of dispensing beverages.

The principal objects of this invention are to provide a distributing system wherein any of a plurality of fluids may be drawn from a source of supply or reservoir through a conduit leading to a common dispensing point, and to provide means for either returning the fluid remaining in the system back to its reservoir or completely discharging the same from the system, so that other fluids may be drawn from their points of supply and conducted through the system to the common dispensing point, returned or discharged from the system, by a simple manipulation of a set of controls.

More specific objects are to provide a distributing system suitable for dispensing beverages such as beer, ale and the like fermented liquors, wherein the beverage remaining in the system may be quickly returned to the source of supply without loss and without altering conditions under which the beverage must be kept in order to prevent deterioration or otherwise impairing its quality; to provide means for flushing out and/or cleaning the system and discharging the cleansing or flushing fluid without disconnecting parts of the system or uncoupling the beverage supply therefrom; and to provide controls which may be located at any convenient place and which may be operated so as to effect the performance of the aforesaid operations efficiently.

Further objects and advantages will be apparent as attributes of the construction and operation of my improved system, and as illustrative of its utility is herein shown and described in connection with a system particularly suitable for dispensing beer and the like beverages.

In accordance with the present invention the supply reservoir, which may be a tank, barrel or the like container of suitable size and shape, is connected to the distributing point or taps by a pipe line or series of pipe lines, which may, if desired, include heating or cooling coils or the like. Although the reservoir may be disposed at an elevation, relative to the dispensing point, which permits a flow through the distributing line or lines by gravity, I preferably employ a gaseous pressure such as compressed air, carbon dioxide or the like to force the liquid or beverage from the supply reservoir to the distributing point or points, particularly where the liquid to be dispensed is a fermented liquor, carbonated beverage or the like which must be kept under pressure in order to maintain its "charge" or "life". To this end the supply reservoir may be connected to a pressure line and suitable means may be employed to maintain a substantially constant predetermined pressure within the reservoir sufficient not only to force the liquid from the reservoir to the distributing point, but also to prevent the beverage from losing its charge.

In order to return any liquid or beverage remaining in the distributing line back to the supply reservoir and/or clear the distributing line of any liquid therein, another pressure line may be connected to the distributing line preferably at a point closely adjacent to its delivery end or tap,— a check valve or the like being provided so as to prevent any liquid from entering the pressure line, and suitable means may be provided to maintain and control the pressure so as to effect a return flow through the distributing line.

Means may also be provided for flushing or cleaning out the distributing line and to this end the distributing line is connected to a flushing line, preferably at a point closely adjacent to its connection with the supply reservoir, and if desired the connection between the lines may include an automatic valve operative in response to differential pressure conditions to open and close these lines. The opposite end of the flushing line may be connected to one or more sources of flushing fluid, such, for example, as a hot or cold water line, a tank or reservoir containing a cleaning fluid, or a steam line, and suitable valves may be provided to connect the flushing line with any one of these different sources of cleaning fluid. In order to clear out the flushing lines and distributing lines, as well as control the flow therethrough, it may be desirable to connect a third pressure line with the flushing line and/or the reservoir containing the cleaning fluid, suitable means being provided to control the pressure applied to the flushing line so as to force the cleaning or flushing fluid through the system and insure the proper operation of the automatic valve to close the distributing lines entering the supply reservoir.

The control valves are preferably closely grouped and may be located at any convenient point in the system so that the operations may be performed by a single operator. For example, the controls may be disposed adjacent to the taps at the distributing point and when so located a single operator may from one position clean out and thoroughly flush the entire system with different cleaning or flushing fluids in a very short interval of time merely by manipulating the valve controls.

In the accompanying drawings which show different embodiments of the invention:

Fig. 1 is a diagrammatic illustration of my improved system;

Fig. 2 is a sectional elevation of one type of automatic valve and coupling for connecting the dispensing line with the reservoir and flushing line;

Fig. 3 is a sectional elevation of a check valve and couplings used to connect the pressure line with the distributing line;

Fig. 4 is a plan view showing the control valves, pressure regulators and associated pipe lines;

Figs. 5 and 6 are diagrammatic front and side elevations showing a system particularly suitable for dispensing beer, ale and the like fermented beverages; and Fig. 7 is a diagrammatic front elevation of a system for dispensing different beverages.

The embodiment shown in Fig. 1 comprises a supply reservoir 1 which may be an enclosed tank, barrel, or the like container suitable for holding the liquid or beverage to be dispensed. The bottom of the reservoir 1 is provided with a discharge line, here shown as an outlet port or duct 2 which is connected with a two-way automatic valve designated by the numeral 3. The valve 3 is provided with a pair of coupling nipples 5 and 6, one of which is connected to a dispensing line 7 and the other to a flushing line 8.

A preferred form of the valve 3, as shown in Fig. 2, comprises a cylindrical sleeve-like body portion 10 having an interior chamber or cavity 10ª. One end of the body portion terminates in an upwardly directed adapter or coupling nipple 6, the other end having an exteriorly threaded nipple portion 6ª which receives a coupling cap 11. The coupling cap 11 is provided with an internally threaded inlet port or opening 13 having an annular beveled shoulder 12 at its inner end and the inner end of the nipple 6 is also provided with a beveled shoulder 14, the two shoulders constituting coaxial, spaced valve seats for cooperation respectively with similarly beveled surfaces at the opposite ends of a cylindrical valve member or piston 15 which has a snug sliding fit within the bore of the sleeve 10. The valve member 15 may be of any suitable material which resists corrosion and is chemically non-reactive with the liquids to be dispensed through the distributing lines, and preferably consists of a cylindrical piece of moulded synthetic resin, for example the substance known as "bakelite", or of like material. The beveled end portions of the member 15 are shaped to seat snugly against the shoulders 12 and 14, respectively, to close the openings at the ends of the sleeve. The nipple 5 is disposed between the ends of the body portion 10 and provides an intermediate port communicating with the chamber 10ª. The parts of the valve are so designed that when the valve member 15 is seated against the shoulder 12, the discharge outlet from chamber 10ª through the nipple 5 is open, thus establishing a free and unrestricted communication between the lines connected to the nipples 5 and 6, and when the valve member is seated against the shoulder 14, as shown by the dot and dash lines of Fig. 2, the discharge outlet from chamber 10ª through the nipple 6 is closed, and a free and unrestricted communication is established between the discharge outlet through the nipple 5 and the inlet through the coupling 11. The position of the vlave 15 and its movement from one position to another is dependent upon the pressure differential in the lines connected with the inlet port 13 and the outlet nipples 5 and 6. For example, when the pressure in line 8 is greater than that in the supply reservoir 1, the valve member 15 is moved toward and seats against the shoulder 12, and when the relative pressure conditions are reversed, the valve member assumes the position shown by the dot and dash lines of Fig. 7.

The distributing line 7 may include a conventional heating or cooling coil 18 disposed within a suitable cabinet or the like compartment conveniently located at or adjacent to the dispensing point, here shown as a bar or dispensing fountain 20, having the usual tap 21.

A pressure line 30 connects the supply reservoir 1 with a two-way valve 31 and a second pressure line 32 connects the valve 31 with the distributing line at a point closely adjacent to the tap 21, the latter connection including a check valve 33 which is preferably of the construction shown in Fig. 3. Pressure regulators or reducers 34 and 35 of any appropriate conventional type are connected in the lines 30 and 32, respectively, so as to maintain predetermined pressure conditions in their respective lines, and, if desired, pressure indicators 34ª, 35ª, for example Bourdon gauges, may be connected in these lines between the regulators and their respective connections with the supply line and distributing line. The valve 31 is connected by a pipe 37 to a suitable gaseous pressure supply which may be compressed air, carbon dioxide gas or the like.

The flushing line 8 is connected to a three-way valve 40 which is operative to connect this line with either a pressure supply line 41, a line 42 which is connected to a flushing tank 43 containing a solution of cleaning fluid, or a water line 45. The valve 40 is preferably located at the bar 20 or at any other convenient point sufficiently close to the tap 21 to be operated in conjunction therewith. The flushing tank 43 is connected by a line 46 to the pressure supply line 37,—a pressure regulator 47 and a shut-off valve 48 being connected in the line 46 so as to provide means for controlling the pressure conditions within the tank 43.

Although the control valves and pressure regulators may be located at any convenient point in the system, I prefer to group them so that they may be operated from a position convenient to the tap 21 by a single operator or attendant. In Fig. 4 I have shown such an arrangement, wherein the pressure supply line 37 is connected to a four-way or cross-coupling 50. One branch of the cross-coupling is connected by a nipple 51 to the valve 31, a second branch is connected to a valve 48, a pressure regulator 47 and the line 46, and the third branch is connected by a short pipe or nipple 41 to the valve 40. One branch 54 of the valve 31 is connected to the pressure regulator 34 which, in turn, is connected by a T-coupling 55 to the pressure line 30 and a gauge 34ª,—the other branch 56 being similarly connected to the pressure regulator 35 which is connected by a T-coupling 57 to the pressure line 32 and a gauge 35ª.

The valve 31 is provided with the usual operating lever or handle 60 by means of which it may be turned so as to shut off both branches 54 and 56 or open one or the other branch, respectively, thus establishing a communication between the line 37 and either of the lines 30 or 32. The valve 40 is likewise provided with the usual operating lever 61 by means of which it may be rotated to one of four positions, viz.: A. connecting lines 8 and 45; B. connecting lines 8 and 37; C. connecting lines 8 and 42; and D. shutting off each of these lines.

The pressure regulators 34, 35 and 47 may be of the conventional type operative to admit or maintain a substantially constant predetermined pressure in their associated lines. In the system herein described the regulator 34 is set so as to maintain a pressure of from 10 to 15 lbs. per square inch in the line 30 and supply reservoir 1, and the regulator 35 is set to maintain a slightly greater pressure in the line 32 and the distributing line 7 (when the valve 31 is set to connect lines 32 and 37), for example, a pressure of from 15 to 20 lbs. per square inch. The regulator 47 is preferably set so as to provide a pressure within the tank 43 greater than that in the line 32, but less than that in the pressure supply line 37 or in the water supply line 45,—for example, a pressure of from 20 to 25 lbs. per square inch. The pressure in both the pressure supply line 37 and the water line 45 should exceed 25 to 30 lbs. per square inch, preferably being of the order of 50 lbs. per square inch.

The operation of the system is as follows: Assuming that the reservoir 1 contains a normal supply of liquid or beverage to be dispensed, that the tap 21 and valves 31, 40 and 48 are in closed position, that atmospheric pressure conditions prevail in the lines 7, 8 and 30, that the regulators 34, 35 and 47 are set to maintain a pressure of 12, 15 and 20 lbs. per square inch in the lines 30, 32 and 46, respectively, and that the pressure in the lines 37 and 45 is of the order of 50 lbs. per square inch, then, under these conditions, the valve 3 automatically operates to connect the line 7 with the supply reservoir 1, due to the pressure exerted by the liquid in the reservoir on the valve member 15. The valve 31 may then be set so as to connect the pressure supply line 37 with the pressure line 30, thus establishing a pressure of about 12 lbs. per square inch in the supply reservoir 1. The tap 21 may then be opened to effect a flow of beverage through the distributing line 7 and the beverage may be dispensed in the usual manner, the pressure maintained on the fluid in the reservoir being sufficient to prevent escape of the gas dissolved in the liquid.

To close the system down and return the beverage remaining in the distributing line 7 back to the reservoir 1, the valve 31 is set so as to close the line 30 and at the same time to connect lines 32 and 37, thus admitting pressure through the check valve 33 to the line 7. As the pressure applied to the line 7 is approximately 15 lbs. per square inch, the beverage in the line 7 is forced back into the reservoir 1, the valve 31 preferably being held open only long enough, as determined by previous experiment, to effect the return flow of the beverage back to the reservoir, whereupon the valve 31 may then be set to close both lines 30 and 32, the pressure remaining in the lines 7 and 32 being sufficient to prevent the beverage from reentering the line 7.

If it be desired to clean out and/or flush the system, after closing the valve 31, the valve 40 is set at either the A position, wherein the flushing line 8 is connected directly to the water line 45, or at the C position wherein the flushing line 8 is connected to the line 42 which leads to the flush tank 43. Assuming that it is desired to clean out the system with a cleaning solution and that such solution is already in the tank 43, the shut-off valve 48 is first opened, thus admitting regulated pressure to the tank 43, and the valve 40 is then set to the C position, connecting the lines 8 and 42. As the cleaning fluid in the tank 43 is under a pressure of approximately 20 lbs. per square inch, it is forced into and through the line 8 causing the valve 3 automatically to shut off the reservoir 1 from the line 7 and connect lines 7 and 8, thus "locking" the beverage within the reservoir so long as the prevailing pressure conditions in the lines 7 and 8 exceed the pressure within the reservoir 1. The tap 21 may then be opened so as to permit a flow of cleaning fluid through the line 7 and if desired, the tap 21 may be left open until the fluid in the tank 43 is exhausted and the fluid completely discharged from lines 7 and 8, or the tap 21 and valve 48 may be closed, thus allowing the fluid to remain in the line 7. In the latter case (after the cleaning fluid has remained in the line 7 the desired length of time) alternative procedures are available to clear the line of the fluid, viz., either the valve 40 may be set at the A position, connecting the water line 45 with the line 8, or set at the B position, connecting the pressure line 37 with the line 8, and in either case the cleaning fluid in the lines 7 and 8 is discharged upon opening the tap 21. If, however, it be desired to salvage the cleaning fluid, then the valve 48 may be opened, the regulator 35 reset so as to admit a pressure exceeding 20 lbs. per square inch to the line 7, and the valve 31 then set to connect lines 32 and 37, thus effecting a return flow of the cleaning fluid back to the tank 43. When this operation has been completed, the valves 31 and 48 are closed and the valve 40 is then set at the A position, thus opening the line 45 to admit water to the lines 8 and 7. The tap 21 may then be opened to flush the system for the desired period, after which the tap may be closed to permit the water to remain in the lines 7 and 8 indefinitely as, for example, over-night, or during any period when the system is not in use.

The water in the line 7 may be expelled by setting the valve 40 at the B position, thus connecting the pressure line 37 to line 8 and opening the tap 21, the pressure of the gas admitted to the line 8 being sufficient to force the water from the system. After having expelled the water from the lines 7 and 8 the valve 40 may then be set at the D position, wherein all lines leading from the valve are closed and the valve 31 may then be operated to connect lines 30 and 37 and the tap 21 opened to admit the beverage to the line 7, the valve 3 having automatically operated to close line 8 when the pressure within lines 7 and 8 was released by the closing of valve 40 and the opening of the tap 21. If desired, the valve 40 may be set at the D position (wherein all lines leading from the valve are closed), the tap 21 opened, and the valve 31 operated to connect lines 30 and 37, in which case the pressure within the reservoir 1, acting on the valve member 15, causes the valve 3 to operate so as to close line 8, thus permitting the beverage to be discharged from the reservoir and expel the water from the line 7. The system having thus been cleaned and flushed, the beverage having been returned to the distributing line and the valves returned to their normal operating positions, the normal operation of dispensing may be resumed when desired.

The embodiment shown in Figs. 5 and 6 is particularly suitable for dispensing beer and the like beverages, and includes all the essential elements of the previously described embodiment, the same reference characters being applied to corresponding parts of the system. In this embodiment a plurality of supply reservoirs, here shown as barrels or kegs, 60$^a$, 60$^b$, 60$^c$, 60$^d$, are provided with discharge outlets or ducts which are connected to two-way valves 3, which, if desired, may be of the type shown in Fig. 2. Dispensing lines 7$^a$, 7$^b$, 7$^c$, 7$^d$, are connected to the outlet nipples 5 of valves 3, and the flushing lines 8$^a$, 8$^b$, 8$^c$, 8$^d$ are connected to the nipples 6 of the valves 3 as in the previously described embodiment.

The dispensing lines include the conventional cooling coils 18 and taps 21 which are located at the dispensing counter or bar 20. Each of the flushing lines are provided with shut-off valves 9$^a$, 9$^b$, 9$^c$, 9$^d$, which are connected with a header 62. The header 62 is connected by a pipe line 63 to a tank 64 for holding a cleaning compound or solution, the tank 64 having a removable cover 65 providing access thereto. A pipe line 66 connects the tank 64 with a two-way valve 68 (corresponding to the valve 40 of the previously described embodiment), one branch of which is connected to a water supply line 69 and the other branch to a line 70 which leads from the main pressure line 72. The valve 68 may be set in one of three positions, viz., A. connecting lines 69 and 66; B. connecting lines 70 and 66; and D. shutting off each of these lines. Preferably the valve is located at or adjacent to the bar 20 so that it may be operated in conjunction with the taps 21.

The pressure line 72 is connected to a suitable source of gaseous pressure, here shown as a carbon dioxide tank 73 furnished with a pressure regulator or reducing valve 74 which is operative to maintain a substantially constant pressure in the line 72. The pressure line 72 is connected with the two-way valve 31, one branch 54 of which is connected with the pressure regulator 34, and the other branch 56 with the pressure regulator 35, as in Fig. 4 of the previously described embodiment.

A pressure line 76 (corresponding with pressure line 30 of the previously described embodiment) connects branch 54 of valve 31 with a header 77, and each of the barrels or reservoirs is connected with the header 77 by lines 78$^a$, 78$^b$, 78$^c$, 78$^d$, respectively,—shut-off valves 79$^a$, 79$^b$, 79$^c$, 79$^d$, being arranged in the lines 78$^a$, 78$^b$, 78$^c$, 78$^d$, so that any of the barrels may be disconnected from the system without interfering with its normal operation.

The branch 56 of valve 31 is connected to the reducing valve 35 and by line 80 (corresponding to line 32 of the previously described embodiment) to a series of valve members 81$^a$, 81$^b$, 81$^c$, 81$^d$, connected to the distributing lines 7$^a$, 7$^b$, 7$^c$, 7$^d$, respectively, at points closely adjacent to the taps 21. Each of these valve members, as shown in Fig. 3, comprises a conventional shut-off valve 82 connected with a check valve 83 which is tapped into a coupling 83 interposed between each of the taps 21 and the distributing lines.

The operation of the system is substantially the same as that shown in the previously described embodiment,—the pressure regulators or reducing valves 34, 35 and 74 being set to maintain pressures of approximately 12, 15 and 50 pounds, respectively, in their associated lines. In this embodiment, in order to clean out the system with a chemical solution, it is first necessary, either to pour the concentrated cleaning solution into the flush tank or place a quantity of an appropriate soluble solid cleansing substance in the tank, in which case the cleansing substance is dissolved by the water passing therethrough when the valve 68 is set to connect lines 69 and 66.

It will be noted that in this embodiment, each of the barrels or reservoirs may be cut out of and/or disconnected from the system without interfering with its normal operation merely by closing the valves 79$^a$, 79$^b$, etc., respectively, and the corresponding valve 82 and that any of the distributing lines leading from the barrels may be flushed out and/or cleaned individually or at the same time with the others.

In Fig. 7 is shown a further modification which is particularly suitable for dispensing different types of beverages such for example as beer and ale. In this embodiment each of the reservoirs or barrels 60$^a$, 60$^b$, 60$^e$, 60$^f$, is provided with the usual discharge outlet which is connected to a two-way valve 3 which may be of the type shown in Fig. 2, and the dispensing and flushing lines are connected to the nipples 5 and 6, respectively, of these valves 3,—the dispensing lines running to the counter or bar and the flushing lines to the water header 62, as in the embodiment shown in Figs. 5 and 6. The water header 62 is connected by line 66 to the flushing tank 64 which is connected by line 67 to a two-way valve 85. One branch or port of the valve 85 is connected to a water main 69 and the other branch or port is connected to a drain pipe 86, the discharge end of which is preferably disposed below the valves 3 so that when the valve 85 is set to connect lines 67 and 86, all water or liquid in the header 62 and the dispensing and flushing lines is drained or siphoned off.

The pressure line 72 is connected with the two-way valve 31 which is preferably located in proximity to the valve 85 so that both valves may be conveniently operated when flushing or cleaning the system. One branch of the valve 31 is connected by a line 87 to a pair of pressure regulators or reducing valves 88 and 89 which are connected with headers 90 and 91, respectively. Pressure lines 95ª and 95ᵇ connect the header 90 with the barrels 60ª and 60ᵇ, respectively, and in like manner pressure lines 95ᵉ and 95ᶠ connect the header 91 with barrels 60ᵉ and 60ᶠ, respectively. Shut-off valves 96ª, 96ᵇ, 96ᵉ, 96ᶠ, are arranged in the lines 95ª, 95ᵇ, 95ᵉ and 95ᶠ, respectively, so that any one or more of the barrels may be disconnected from or cut out of the system without interfering with its normal operation. The other branch of valve 31 communicates with a pressure regulator or reducing valve 98 and by a pressure line 80 to a header connected to a series of valve members 81ª, 81ᵇ, 81ᶜ, and 81ᵈ, which are connected to the respective dispensing lines adjacent to the tap, as in the embodiment shown in Figs. 5 and 6.

In operating this system, the reducing valves 88, 89 and 98 are set to maintain pressures of approximately 12, 15 and 20 lbs. in the headers 90, 91 and in the pressure line 80, respectively, and the valve 31 is set to connect lines 72 and 87, thus maintaining a pressure of approximately 12 and 15 lbs. per square inch in headers 90 and 91, respectively. In order to clean out and/or flush the system, the valve 31 is set to connect lines 72 and 80 and after having effected a return flow of the beverage within the dispensing line back to their respective barrels, the valve 31 is set to close all lines leading therefrom and the valve 85 is then set to connect the water main 69 with the line 67, thus causing the water to flow through the tank 64, header 62 and the flushing and dispensing lines when the taps at the bar are open. The water or flushing fluid may be expelled from the system merely by setting the valve 85 to connect the lines 67 and 86, thus permitting the water in the system to siphon off through the drain pipe 86.

While I have shown and described different desirable embodiments of the present invention, it is to be understood that this disclosure is for the purpose of illustration only, and that various changes in shape, proportion and arrangement of parts, as well as the substitution of equivalent elements for those shown and described may be made without departing from the spirit and scope of the invention set forth in the appended claims.

I claim:

1. A system of the class described comprising a supply reservoir having an outlet port, a dispensing line, a flushing line, valve means operable to connect said outlet port with said dispensing line and said dispensing line with said flushing line, a water supply line, a cleaning fluid line, a valve operable to connect said water supply line with said flushing line and said cleaning fluid line with said flushing line, a pressure line connected with said dispensing line adjacent to its delivery end, a pressure line connected with said cleaning fluid line, and valve means operative to control the pressure conditions in said pressure lines and the flow through said dispensing line and flushing line.

2. A system of the class described comprising a supply reservoir having an outlet port, a dispensing line, a flushing line, valve means operable to connect said outlet port with said dispensing line and said dispensing line with said flushing line, a water supply line, a cleaning fluid tank having a discharge line leading therefrom, a valve operable to connect said water supply line with said flushing line and said discharge line with said flushing line, a pressure line connected with said dispensing line adjacent to its delivery end, a pressure line connected with said cleaning fluid tank, and valve means operative to control pressure conditions in said pressure lines and the flow through said dispensing line and flushing line.

3. A system of the class described comprising a supply reservoir having an outlet port, a dispensing line, a flushing line, valve means operable to connect said outlet port with said dispensing line and said dispensing line with said flushing line, a low pressure line connected to said reservoir, a high pressure line connected with said dispensing line adjacent to its delivery end, a third pressure line connected with said flushing line, and valve means operative to control pressure conditions in said pressure lines, whereby to control the flow through said dispensing line and flushing line.

4. A system of the class described comprising a supply reservoir having an outlet port, a dispensing line, a flushing line, valve means operable to connect said outlet port with said dispensing line and said dispensing line with said flushing line, a water supply line, a cleaning fluid tank having a discharge line leading therefrom, a valve operable to connect said water supply line with said flushing line and said discharge line with said flushing line, a low pressure line connected to said reservoir, a high pressure line connected to said dispensing line adjacent to its delivery end, a third pressure line connected with said cleaning fluid tank, and valve means operative to control the pressure conditions in said pressure line, whereby to control the flow through said dispensing line and flushing line.

5. A system of the class described comprising a supply reservoir having an outlet port, a dispensing line, a flushing line, valve means operable to connect said outlet port with said dispensing line and said dispensing line with said flushing line, a cleaning fluid tank connected to said flushing line, a low pressure line connected with said reservoir, a high pressure line connected with said dispensing line adjacent to its delivery end, valve means operative to control the pressure conditions with said pressure lines, and means constructed and arranged to discharge cleaning fluid from said dispensing line.

6. A system of the class described comprising a supply reservoir having an outlet port, a dispensing line, a flushing line, valve means operable to connect said outlet port with said dispensing line and said dispensing line with said flushing line, a water supply line and a cleaning fluid tank connected to said flushing line, a low pressure line connected to said reservoir for forcing liquid therein through said dispensing line, a high pressure line connected to said dispensing line adjacent to its delivery end for forcing liquid in said dispensing line back into said reservoir, and means operative to discharge fluid in said dispensing and flushing lines when said dispensing and flushing lines are connected.

FRED F. DAVIS.